May 19, 1964
E. BECK
3,133,719
SUPPORT FOR OPTICAL DEVICES
Filed Dec. 19, 1961
2 Sheets-Sheet 1
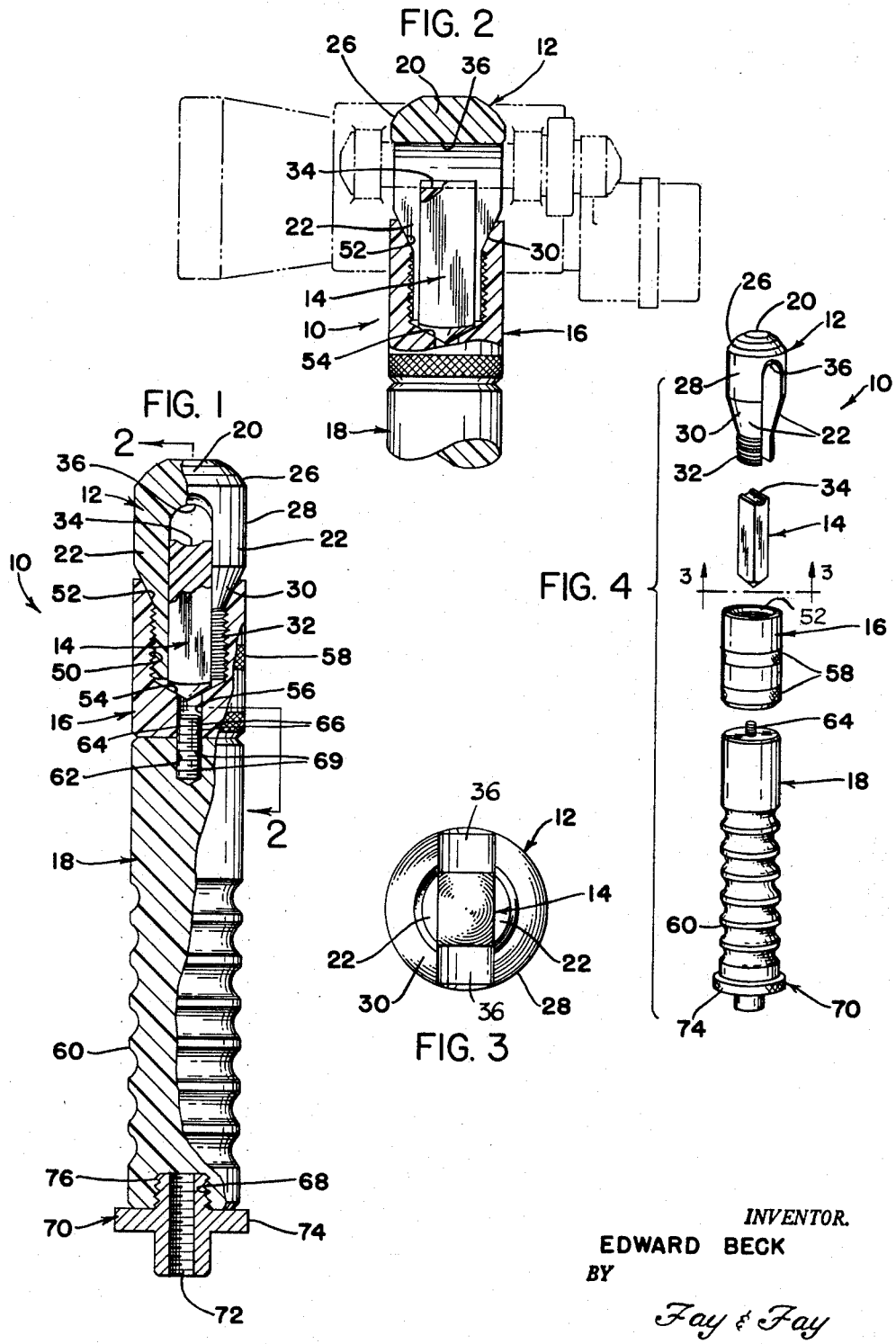
INVENTOR.
EDWARD BECK
BY
Fay & Fay
ATTORNEYS May 19, 1964  E. BECK  3,133,719
SUPPORT FOR OPTICAL DEVICES
Filed Dec. 19, 1961  2 Sheets-Sheet 2
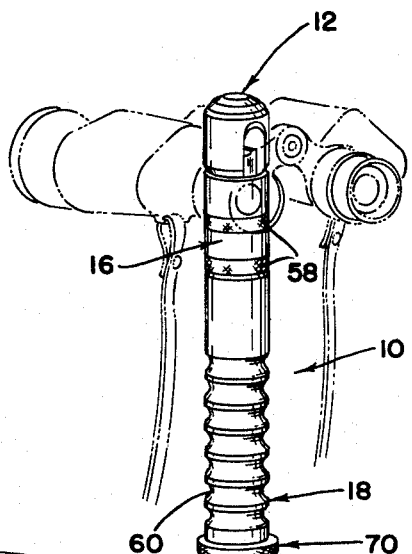
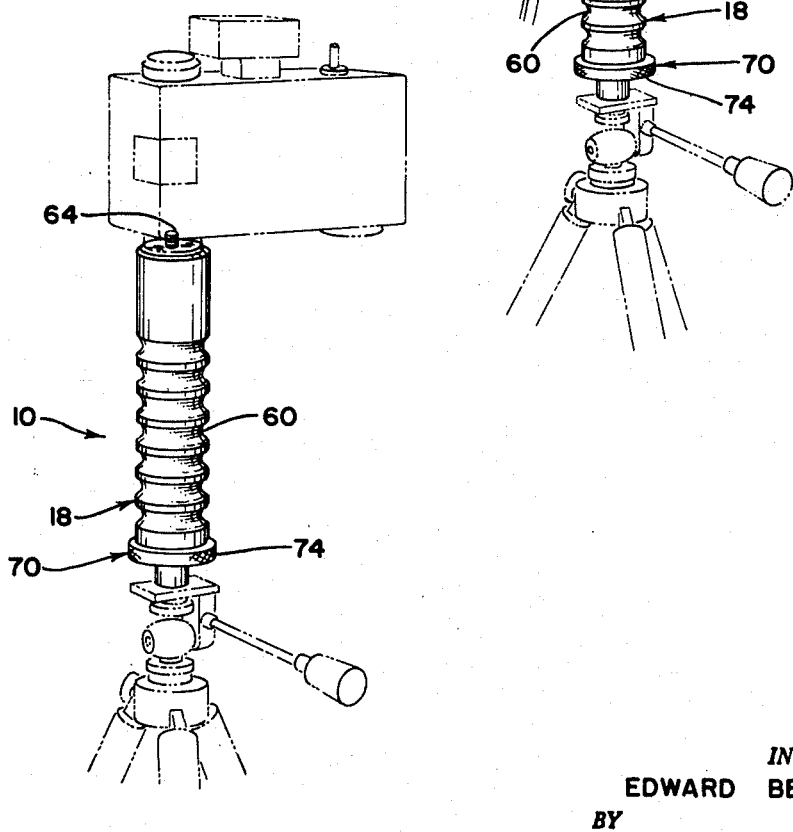
INVENTOR.
EDWARD BECK
BY
*Fay & Fay*
ATTORNEYS United States Patent Office 3,133,719
Patented May 19, 1964

3,133,719
SUPPORT FOR OPTICAL DEVICES
Edward Beck, Cleveland, Ohio, assignor to Crawford Fitting Company, Cleveland, Ohio, a corporation of Ohio
Filed Dec. 19, 1961, Ser. No. 160,525
4 Claims. (Cl. 248—187)

This invention relates to an improved support for optical devices and is particularly useful in adapting standard tripods for holding binoculars, cameras, and other optical devices. It may be used with a standard camera tripod to raise its height capacity, or without a tripod to act as a handy grip for a camera or other device.

In its broadest sense the support device of the invention includes an adaptor or clamp means and a handle or extension means for supporting optical devices, such as binoculars, cameras, and the like. The clamp means comprises an elongated outer body having a threaded bore in one end and a larger threaded bore in its opposite end, an elongated clamp member having a leg connecting or bridging portion on one end and projecting legs on its opposite end in threaded engagement with the larger bore of the outer body, and a resilient plug of a length greater than the length of the larger bore of the outer body disposed between the projecting legs and spaced from the connecting portion of the clamp member. The extension means includes an elongated body having a gripping portion of circular ridges and furrows intermediate its ends and threaded connection means on each of its ends for connection, either directly or by use of the clamp means, to a camera or other device on one end and to a tripod on the other.

In its preferred form, the invention is dimensioned for use with standard tripods, such as might be purchased at most photographic equipment stores. When used with such a tripod, it provides a conveniently connected or disconnected adaptor to support binoculars and other devices which do not have standard threaded bore for mounting on a tripod. The adaptor is designed to hold a device firmly without marring or scratching its surface, in a manner which permits precise adjustment and steady support. When used with binoculars it eliminates the need to relocate a subject after having looked away and minimizes handling and resultant fingerprints and corrosion. The detachable extension portion of the device provides a convenient handle mountable directly on a camera or other device having a standard tripod mount. The handle also increases the height capacity of any standard camera tripod with which it is used. Moreover, the handle may be used with the clamp type adaptor to provide a convenient handle means for binoculars and other devices not adapted for direct tripod mounting.

The structure of a support constructed according to this invention is such that it is easily manufactured wtih all operations being performed by standard machining techniques. Moreover, the device is easy to use since all connections are made by threads, and no hooks, straps, or other clumsy devices are necessary for its use.

It is an object of the invention to provide a simple, versatile clamp means for use with a tripod.

It is another object of the invention to provide an extension to raise the height capacity of a tripod.

It is a further object of the invention to provide a clamp device for adapting a standard tripod for use in holding binoculars and other optical devices.

It is a still further object of the invention to provide a handle of simplified construction for cameras.

It is still another object of the invention to provide a handle with a clamp means for supporting binoculars and other optical devices.

Other and more specific objects of the invention will become apparent from the description of the drawings and the explanations to follow.

In the drawings:

FIG. 1 illustrates a front view of the clamp means and extension means of the invention with parts broken away;

FIG. 2 is a fragmentary view along line 2—2 of FIG. 1 showing a cross-section of the clamp means of the invention with conventional binoculars, shown in phantom, mounted thereon;

FIG. 3 is a detached bottom plan view of the clamp means along the line 3—3 of FIG. 1;

FIG. 4 is an exploded view showing the arrangement and shapes of the various parts of the invention;

FIG. 5 is a perspective view of the support structure of the invention in use with a standard tripod and binoculars;

FIG. 6 is a perspective view of the extension portion of the invention in use with a camera and tripod.

Referring to the drawings more particularly, wherein like parts are designated by like numerals in the several views: The support structure of the invention as shown in FIG. 1 is generally designated by the numeral 10 and is comprised of four principal parts; a clamp means 12, a resilient insert member 14, an elongated outer body 16, and an extension means 18. The clamp means 12 includes a bridge or connecting portion 20 having parallel projecting legs 22 extending therefrom and integral therewith. The outer periphery of the legs 22 define with their inner surfaces chordal segments of a circle, when viewed in FIG. 4. The bridge portion 20 of the clamp means 12 is appropriately beveled or rounded as shown at 26. The axial portion adjacent the portion 26 is cylindrical as shown at 28 except for the slotted portion between the legs 22. Axially adjacent portion 28 is a conical portion 30 which tapers axially inwardly away from the portion 28 to a threaded cylindrical outer portion 32. The portions 30 and 32 are on the legs 22 and are broken by the slotted space between the legs.

The resilient plug member 14 is disposed in the space between the legs 22 and extends axially from a point beyond the free ends of the legs 22 in the direction of the bridge portion 20 to a point spaced therefrom. The end of the member 14 projecting beyond the free ends of the legs 22 preferably abuts a portion of the outer body 16 and is rotatable with the legs 22 relative to said outer body 16. The opposite end of the plug 14 has a work engaging seat 34 which cooperates with the inner axial surface 36 of the bridging portion 20 to engage and thereby clamp a portion of the optical device to be supported, as illustrated in phantom in FIG. 2. The plug member 14 may be of any resilient material softer than the member 12 but is preferably of polytetrafluoroethylene to reduce friction and withstand wear.

The member 12 may be of any material, such as plastic, metal, or wood, although a machinable plastic material preferably is used to facilitate manufacture and to prevent marring or scratching of the surface of the instrument to be supported. The elongated outer body member 16 has a threaded bore 50 of the same diameter as the portion 32 of member 12, and a conical portion 52 on the edge of said bore of complementary taper to that of the conical portion 30 surrounds the legs 22 and the resilient plug 14 therebetween and is threadedly engaged therewith. The portion of the member 14 which extends axially beyond the legs 22 abuts the bottom or base 54 of the bore 50, such that threading of the member 12 into the member 14 will cause relative axial movement of the member 14 toward the bridging member 20. This axial movement provides the clamping force for the optical device or similar member being supported.

In the end of the outer body 16 opposite the bore 50, is provided a second threaded bore 56 of a diameter to fit a standard tripod stud. The clamp assembly of the structure consisting of the members 12, 14, and 16, may be used to adapt a standard tripod to all types of holding applications, wherever precision positioning is necessary. The external periphery of member 16 preferably is cylindrical and has knurled portions 58 thereon to facilitate mounting.

The handle member 18 is an elongated body having a ridged and furrowed gripping portion 60 intermediate its ends and having aligned threaded bores of a diameter standard for tripods. The member 18 has a bore 62 in one end of a diameter to cooperate with the threaded stud of a standard tripod. Threaded in bore 62 is a stud 64 having standard thread portions 66 and 69, such that the portion 66 provides engagement with the threaded bore 56 of the member 16. One the end of the member 18 opposite the bore 62 a metal insert 70 is disposed having a threaded bore 72, a knurled circular flange 74 of greater radial dimension than the body of the member 18, and threads 76 engaged by threaded portion 68 of the member 18. Bore 72 is adapted to have a standard tripod threadedly connected thereto, as illustrated in phantom in FIGS. 5 and 6.

When used with binoculars, as shown in FIG. 5 for instance, the large seat area of the resilient plug 14, lightly but steadily and firmly grips the binoculars, thereby preventing any marring or scratching of the surface thereof and minimizing fingerprints and the corrosion which would result therefrom. This use permits more precise aiming and adjustment of the binoculars and allows the viewer to look away after once sighting a subject without having to resight the subject in the lenses for further viewing. The tapered portion 30 of the member 12, and 52 of the member 16, cooperate to provide a positive rotational seat which steadies the binoculars and prevents inadvertent overthreading of the two members and any damage to the legs 22 which might result therefrom.

The clamp assembly comprising the members 12, 14, and 16, may be used to mount various apparatus on a tripod with or without the handle or extension member 18. When used with the member 18, the height capacity of a tripod may be increased. The stud 64 of the member 18 is dimensioned so that it may threadedly engage either the tripod mounting bore of a standard camera, or the bore 56 of the member 16.

In addition to its function as a tripod extension, the member 18 with its gripping portion 60 acts as a very efficient handle for a camera and permits its steady sighting, thereby minimizing the danger of blurred pictures, without the necessity of carrying and setting up a tripod.

The embodiments of the present invention specifically described and illustrated herein are exemplary only and are not intended to limit the scope of the present invention, which is to be interpreted in the light of the prior art and the appended claims only, with due consideration for the doctrine of equivalents.

What is claimed is:

1. A support for optical devices comprising an elongated outer body having a threaded bore in one end and a larger threaded bore in its opposite end, a clamp member having a connecting portion and legs projecting therefrom in threaded engagement with the larger bore of the body, a resilient plug of a length greater than the length of the larger bore of the body abutting the end of said bore between the legs in spaced relation with the connecting portion of the clamp member, the inner edge of the larger threaded bore of the body being beveled to form a conical seat to receive a complementary conical portion of the projecting legs on the clamp member.

2. The structure of claim 1 in which the smaller threaded bore is threadedly engaged by a stud member which projects from a second elongated body having on the end opposite the stud a threaded bore of the same diameter as the diameter of the smaller threaded bore.

3. The structure of claim 1, characterized by said plug being guidedly received between said projecting legs.

4. The structure of claim 1, including a second elongated body having ridges and furrows intermediate its ends, a first threaded bore of predetermined dimension in one end of the second elongated body, a stud at one end threadedly engaging said first bore, and at the other, threadedly engaging the smaller threaded bore of said elongated outer body and a metal insert threaded in a bore in the end of said second elongated body opposite said first bore having a narrow flange extending radially outwardly beyond said ridges and having a threaded bore of said predetermined dimension.

References Cited in the file of this patent

UNITED STATES PATENTS

| 449,531 | Gerow | Mar. 31, 1891 |
| 2,132,293 | Harrer | Oct. 4, 1938 |
| 2,771,826 | Shapiro | Nov. 27, 1956 |
| 2,895,697 | Pagliuso | July 21, 1959 |

FOREIGN PATENTS

| 907,141 | Germany | Mar. 22, 1954 |
| 1,127,529 | France | Aug. 13, 1956 |